(No Model.) 2 Sheets—Sheet 2.

W. DOUGHERTY.
FILTER AND HEATER FOR STEAM BOILERS.

No. 417,712. Patented Dec. 24, 1889.

Attest:
Walter Scott
J. W. Brandenburg

Inventor
William Dougherty
By his Attorneys,
Paine & Ladd

United States Patent Office.

WILLIAM DOUGHERTY, OF CHESTER, PENNSYLVANIA, ASSIGNOR OF ONE-HALF TO JAMES P. FEELEY, OF SAME PLACE.

FILTER AND HEATER FOR STEAM-BOILERS.

SPECIFICATION forming part of Letters Patent No. 417,712, dated December 24, 1889.

Application filed May 9, 1889. Serial No. 310,164. (No model.)

*To all whom it may concern:*

Be it known that I, WILLIAM DOUGHERTY, a citizen of the United States, residing at Chester, in the county of Delaware and State of Pennsylvania, have invented certain new and useful Improvements in Filters and Heaters for Steam-Boilers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention pertains to certain new and useful improvements in boilers, having for its object the provision of simple and highly-efficient means for filtering the water supplied thereto and collecting the sediment therein, so that it is readily removed from the boiler.

A further object is to heat the feed-water before it is supplied to the filter to such a high degree as to effect the precipitation of lime, magnesia, and all impurities contained therein, and thus prevent incrustation on the interior of the boiler, and also avoid reducing the temperature of the water contained therein.

The invention comprises a filter having apertured supply and blow pipes, and a series of coiled pipes located in the smoke-chamber of the boiler, and also a surface blow or circulation pipe connected to the main water-supply pipe, substantially as hereinafter fully set forth, and particularly pointed out in the claims.

Figure 1:
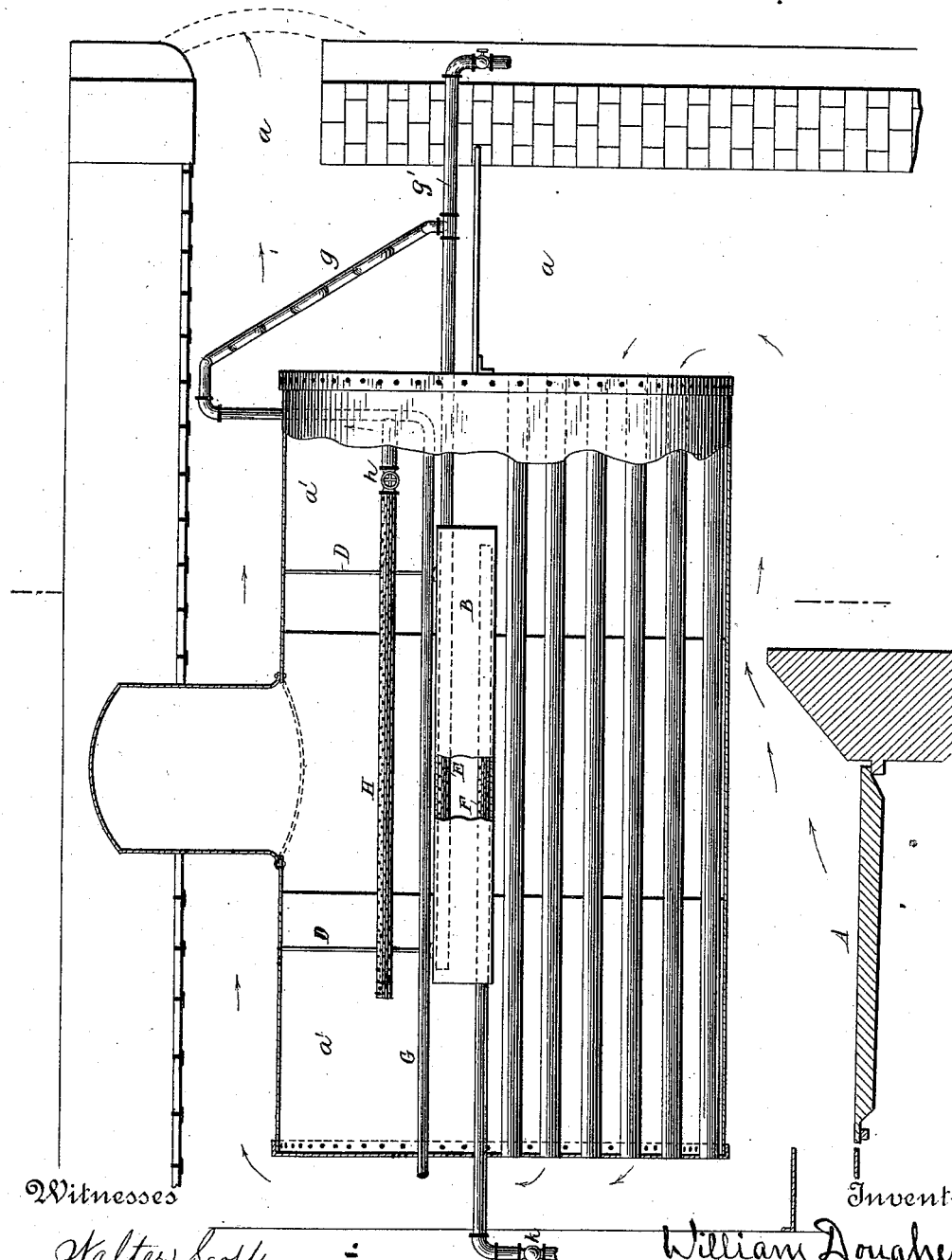
Figure 2:
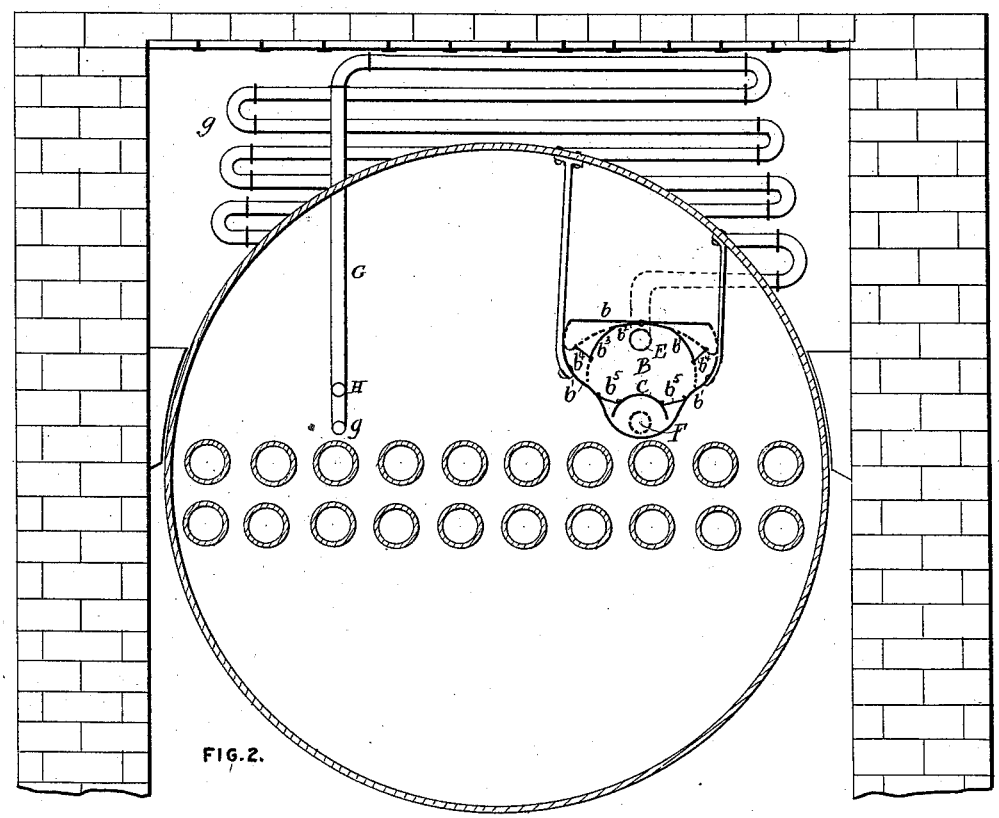
Figure 3:
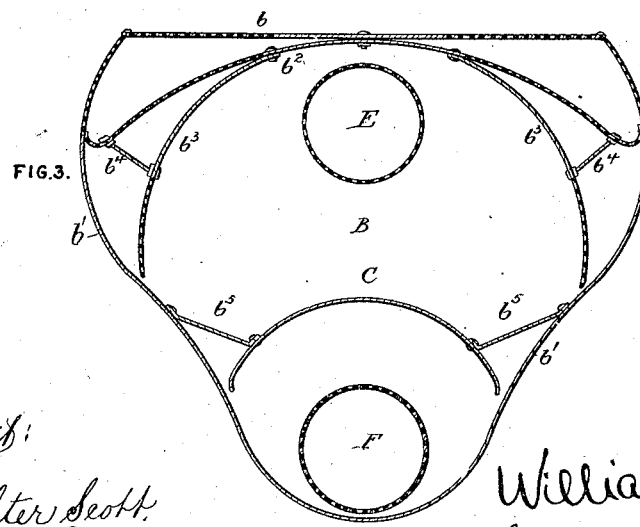

In the accompanying drawings, Figure 1 is longitudinal sectional view of a boiler and heater, showing my invention applied thereto. Fig. 2 is a transverse sectional view on the line $x\ x$, Fig. 1. Fig. 3 is an enlarged cross-sectional view of the filter.

Referring to the drawings, A designates the furnace; $a$, the smoke-chamber, and $a'$ the boiler. Within this boiler and extending longitudinally thereof is a filter B, which comprises an upper horizontal apertured cap-plate $b$, to which are secured the opposite ends of a shell $b'$, of approximately V shape. To plate $b$ is connected the central portion of an upper perforated strainer-plate $b^2$, to which in turn are secured opposite lower strainer-plates $b^3\ b^3$, having lower free ends and supported by brace-rods $b^4\ b^4$, as shown. A central curved plate C, extending the entire length of the filter, is connected thereto by brace-rods $b^5$. This filter-frame thus constructed is suitably secured to the top of boiler $a'$ by hanging plates D D.

E is a perforated feed-pipe located within the filter B between the lower strainer-plates $b^3$, and F is the perforated blow-pipe, also located within the filter beneath the curved plate C.

The water to be supplied to the boiler is forced through pipe E, and passing through the strainer-plates is thoroughly filtered, the sediment passing to the bottom of shell $b'$. To free the boiler from this sediment collected in the filter, blow-pipe F is brought into play and said sediment readily removed by opening valve K, and the pressure in the boiler will force the sediment out of pipe F.

To additionally prevent the collection of sediment in the boiler proper and to free the water of all impurities and effect the precipitation of lime and magnesia, I connect the main water-supply pipe G with a series of coiled pipe $g$, arranged horizontally and on an incline in the rear portion of smoke-chamber $a$. At its lower end this coiled pipe is connected directly to the feed-pipe E, leading to the filter. By thus arranging the inclined coils of the main feed-pipe in the smoke-chamber the water is thoroughly heated to a temperature of about 300° or greater, and all impurities in the water, including both lime and magnesia, are separated therefrom. The inclination given to the coils allows of a free circulation and forces the sediment down to feed-pipe E, through which the water passes to the filter, where such sediment and water are entirely separated. A short valved extension $g'$ of feed-water pipe E is projected through the end wall of the furnace, as shown in Fig. 1.

H is what I term a surface blow or circulation pipe, provided with a check-valve $h$, and secured at one end to the main water-supply pipe G above the filter B. This pipe H will create a circulation of the water in the boiler when water is not being fed from a pump, and it will also draw any impurities off from the surface of the water in the boiler and deposit same in the filter through the water-supply pipe.

It will be understood that the filter can be used without the heater.

I claim as my invention—

1. As an improvement in boilers, the filter herein described, having water-feed and blow pipes extending therein to near opposite ends thereof, and a curved plate C, longitudinally disposed in said boiler above said blow-pipe, substantially as set forth.

2. As an improvement in boilers, the filter herein described, longitudinally disposed in a boiler and provided with strainer-plates, and water-feed and blow pipes extending through said filter to near opposite ends thereof, and a curved plate C, beneath which said blow-pipe is disposed, substantially as set forth.

3. As an improvement in boilers, the filter herein described, located in the boiler and provided with upper and lower strainer-plates, the latter being free at their lower ends, a longitudinally-disposed curved plate, and water-feed and blow pipes, substantially as set forth.

4. The combination, with a furnace and the boiler located therein, of the filter secured in said boiler and provided with strainer-plates, and the water-supply pipe having a series of inclined coils arranged in the smoke-chamber of said furnace and extending into said filter beneath and between said strainer-plates, substantially as set forth.

5. The combination, with a furnace and the boiler located therein, of the filter secured in said boiler, the curved plate C, longitudinally disposed therein, the blow-pipe extending through said filter beneath said plate, and the water-supply pipe having a series of inclined coils arranged in the smoke-chamber of said furnace and extending into said filter, substantially as set forth.

6. As an improvement in boilers, the filter having the blow-pipe, the water-supply pipe leading thereinto, and the upper surface blow or circulation pipe connected to said water-supply pipe, substantially as set forth.

7. The combination, with the boiler and its heater, of the filter located therein, through which the water-supply is passed, and wherein the sediment is collected, the blow-pipe located in said filter, the water-supply pipe passed through the smoke-chamber of said heater, and the upper blow or circulation pipe connected to said water-supply pipe, substantially as set forth.

In testimony whereof I affix my signature in presence of two witnesses.

WILLIAM DOUGHERTY.

Witnesses:
JAMES NEWSOME,
C. C. EYRE.